United States Patent
David et al.

(10) Patent No.: US 10,817,770 B2
(45) Date of Patent: Oct. 27, 2020

(54) CONTAINER TRACKING

(71) Applicant: Inmarsat Global Limited, London (GB)

(72) Inventors: Hilary Charles David, London (GB); Johnny Nemes, London (GB)

(73) Assignee: Inmarsat Global Limited, London (GB)

( * ) Notice: Subject to any disclaimer, the term of this patent is extended or adjusted under 35 U.S.C. 154(b) by 355 days.

(21) Appl. No.: 15/748,383

(22) PCT Filed: Jul. 26, 2016

(86) PCT No.: PCT/GB2016/052286
§ 371 (c)(1),
(2) Date: Jan. 29, 2018

(87) PCT Pub. No.: WO2017/017437
PCT Pub. Date: Feb. 2, 2017

(65) Prior Publication Data
US 2018/0218250 A1    Aug. 2, 2018

(30) Foreign Application Priority Data
Jul. 30, 2015   (GB) .................................. 1513450.5

(51) Int. Cl.
*G06K 19/077* (2006.01)
*H01Q 1/22* (2006.01)
*H01Q 9/42* (2006.01)
*H01Q 13/06* (2006.01)

(52) U.S. Cl.
CPC ..... *G06K 19/07773* (2013.01); *H01Q 1/2208* (2013.01); *H01Q 1/2216* (2013.01); *H01Q 1/2225* (2013.01); *H01Q 9/42* (2013.01); *H01Q 13/06* (2013.01)

(58) Field of Classification Search
CPC ....................... G06K 19/07773; H01Q 1/2208
See application file for complete search history.

(56) References Cited

U.S. PATENT DOCUMENTS

| 6,278,369 | B2 |   | 8/2001 | Smith et al. |
| 7,414,571 | B2 | * | 8/2008 | Schantz ................ G01V 15/00 |
|           |    |   |        | 340/539.22 |
| 8,140,262 | B2 | * | 3/2012 | Walz .................... G01S 5/0294 |
|           |    |   |        | 701/468 |

(Continued)

FOREIGN PATENT DOCUMENTS

| CN | 201867863 U | 6/2011 |
| CN | 202404638 U | 8/2012 |
| WO | 2008006947 A1 | 1/2008 |

OTHER PUBLICATIONS

Ukkonen L., et al. "Planar wire-type inverted-F RFID tag antenna mountable on metallic objects." Antennas and Propagation Society International Symposium, 2004. IEEE. vol. 1. IEEE, 2004.

*Primary Examiner* — Marcus E Windrich
(74) *Attorney, Agent, or Firm* — Sterne, Kessler, Goldstein & Fox P.L.L.C.

(57) ABSTRACT

A container tracking system includes a plurality of metallic containers arranged with substantially parallel sides having a gap therebetween, and at least one RF transmitter having an antenna located within the gap and arranged to excite a transverse electromagnetic (TEM) wave transverse to the parallel sides.

18 Claims, 6 Drawing Sheets

(56) References Cited

U.S. PATENT DOCUMENTS

| | | |
|---|---|---|
| 8,169,322 B1 | 5/2012 | Zhan et al. |
| 8,203,451 B2 * | 6/2012 | Evans .................... G06Q 50/28 340/572.1 |
| 2006/0086809 A1 | 4/2006 | Shanks et al. |
| 2006/0109106 A1 * | 5/2006 | Braun .................... G06Q 10/08 340/539.13 |
| 2008/0136624 A1 * | 6/2008 | Twitchell ............... G08C 17/02 340/539.22 |
| 2009/0045916 A1 | 2/2009 | Nitzan et al. |
| 2009/0102660 A1 * | 4/2009 | Evans .................... G06Q 50/28 340/572.1 |
| 2009/0224778 A1 * | 9/2009 | Sato .................. G01R 31/2822 324/750.01 |
| 2011/0148731 A1 * | 6/2011 | Asrani .................... H01Q 1/50 343/841 |
| 2012/0268327 A1 | 10/2012 | Sardariani et al. |

* cited by examiner

CONTAINER TRACKING

FIELD OF THE INVENTION

This invention relates to an arrangement for RF (radio frequency) tracking of a shipping container, such as an intermodal freight container.

BACKGROUND

Shipping containers, such as intermodal freight containers, typically comprise standardised reusable rectangular steel boxes varying in length from 8 to 56 feet (2.4 to 17 m) and in height from 8 feet to 9 feet 6 inches (2.4 to 2.9 m), and may comply with ISO 6436. Such containers are widely used for transport of goods across sea and land, and it is therefore desirable to be able to identify individual containers, to track their location and/or to receive status information from them.

Existing wireless solutions for container tracking work well in free space conditions, but less well when the container is located in a stack of containers, for example in a dockside environment or on a ship.

Patent publication U.S. Pat. No. 7,414,571 discloses a low frequency transmitter tag that exploits near field behaviour in gaps between containers in a stack.

STATEMENT OF THE INVENTION

According to one aspect of the present invention, there is provided an RF tag according to claim 1. According to another aspect of the invention, there is provided a container tracking system according to claim 14.

Embodiments of the invention may use the channels created by the container walls when the containers are stacked, to create a propagation environment similar to that of a transmission wave guide. Studies and investigations into RF propagation in the above environments show that, when using the correct propagation methods, the RF radiated path can be enhanced by the container stack. The channels within the container stack act like waveguide to channel RF radiation creating a positive RF radiation environment.

When the containers are closely spaced in a closed environment, such as the hull or deck of a ship, the shielded enclosure forms a highly reflective environment for the propagation of radio waves.

An electromagnetic wave can potentially propagate very efficiently between the spacing of stacked or adjacent containers under specific conditions. The walls of adjacent containers form a parallel-plate transmission line (or waveguide) where the extent of the walls tends to infinity. In reality, the containers have finite dimensions, but these are electrically large compared to the wavelength of practical frequencies (~0.35 m at 868 MHz). Therefore the container walls and the gap can be considered to approximate a parallel-plate transmission line.

Parallel-plate transmission lines can support waveguide-type modes (transverse electric—TE, and/or transverse magnetic—TM) if the gap is larger than a half wavelength. However, typical container spacing is much less than a half wavelength, which rules out the support of TE and TM waves.

The inventors have discovered that the spacing between the parallel walls could be much smaller than a half wavelength and still support RF propagation, but only if the transverse electromagnetic (TEM) wave was excited between the parallel container walls. Propagation of the TEM wave requires the electric field component to be perpendicular to the parallel plates (i.e. container walls). Therefore, an RF tag placed between close-spaced container walls should have an antenna that predominantly generates an electric field at right-angles to the container wall. Planar antenna designs parallel to the container wall (e.g. printed loop antenna designs typically used for RFID applications) would be wholly incompatible with the generation of a TEM wave for this purpose. An example of a suitable antenna might be a short monopole perpendicular to the wall.

The attenuation constant of a parallel-plate transmission line is low, despite the likely use of steel container walls (steel is a lossy conductor at UHF and microwave frequencies). In other words, the transmission of RF energy between the container walls may be very efficient and may cover a large volume (compartment) within the hold of a container ship.

An antenna that can be inserted between close-spaced parallel plates should be relatively compact. Furthermore, to excite a TEM wave between the parallel plates, the antenna should generate significant electric field perpendicular to the parallel plates. Preferably, the antenna should be able to operate effectively both for a single container (i.e. open propagation) or for the parallel-plate scenario (i.e. transmission line) without significant difference in performance caused by detuning.

An RF tag placed between adjacent or stacked containers should be low profile. Its footprint may primarily be determined by the circuit board and/or battery dimensions, while its height will be governed by the limited available space (which may be less than or equal to the depth of typical container corrugation).

An embodiment of the invention comprises an inverted-L or inverted-F antenna which is tolerant to being placed between parallel plates and which generates a sizeable electric-field component perpendicular to the parallel plates, thereby exciting the desired TEM wave.

The electric field component of the TEM wave is oriented at right-angles to the two parallel plates, thus providing efficient propagation of RF energy between adjacent and/or stacked containers.

Aspects of the present invention are defined with reference to the accompanying claims.

BRIEF DESCRIPTION OF THE DRAWINGS

Embodiments of the invention will now be described, by way of example only, with reference to the accompanying drawings in which.

DESCRIPTION OF EMBODIMENTS

Antenna Design

FIGS. 1 to 4 illustrate the performance of an inverted-L antenna in an embodiment of the invention.

Figure 1A:
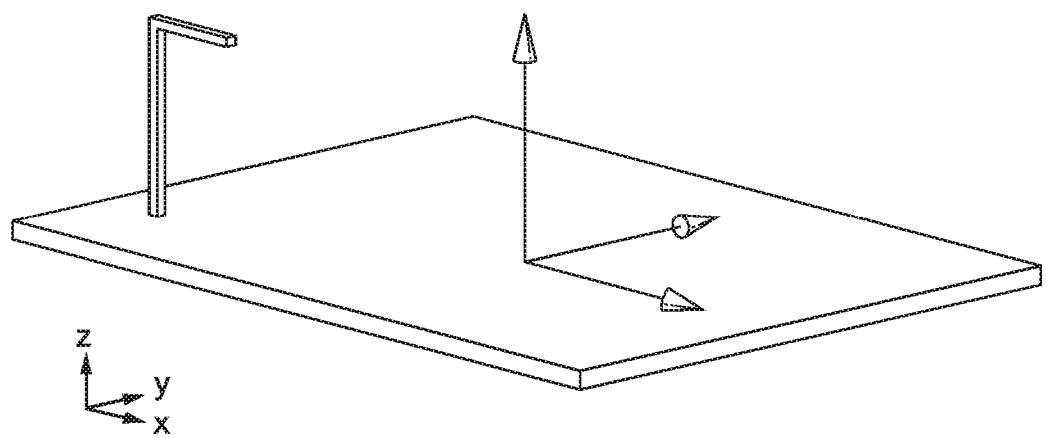
FIGS. 1a and 1b show respectively a model of an inverted-L antenna and its simulated radiation pattern, in an embodiment of the present invention.

FIG. 1a shows the inverted-L antenna 1 comprising a first portion 1a extending substantially perpendicularly to a ground plane 2 (i.e. in the z direction shown in FIGS. 1a and 1b), and a second portion 1b extending substantially parallel to the ground plane 2 (i.e. in the x direction). The ground plane 2 may comprise a PCB (printed circuit board) for connection of other components to the antenna 1, as described further below.

Figure 1B:
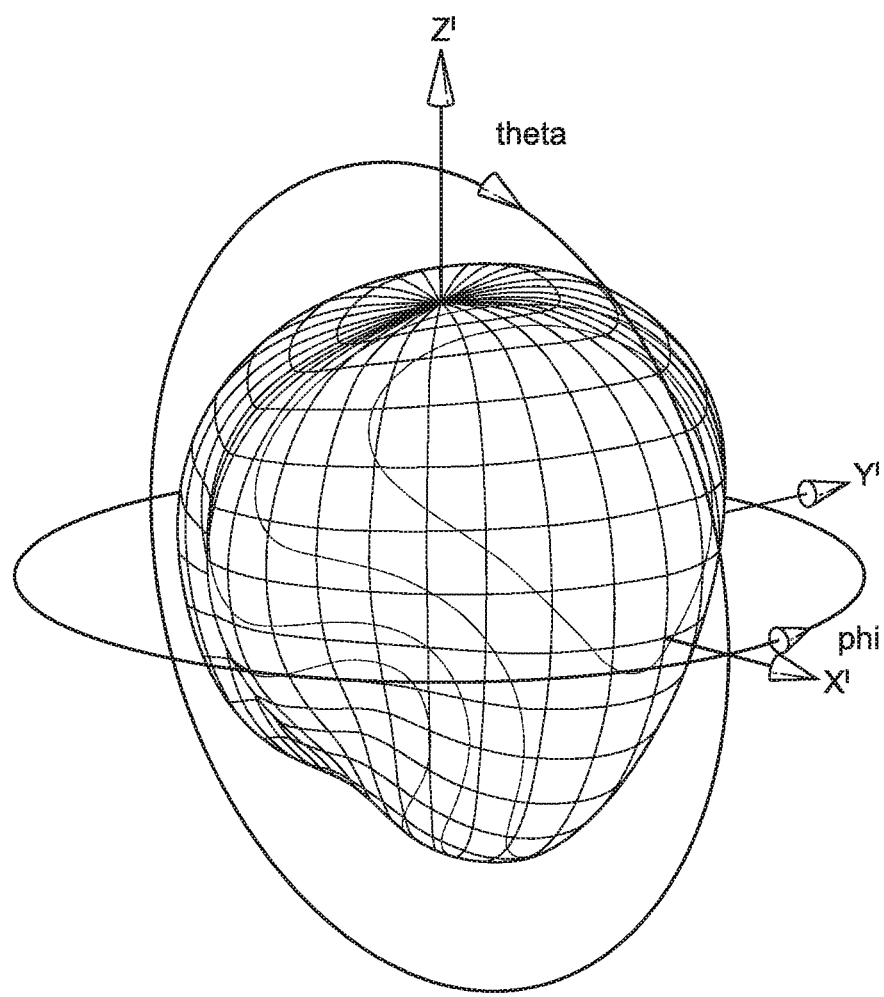
Figure 2A:
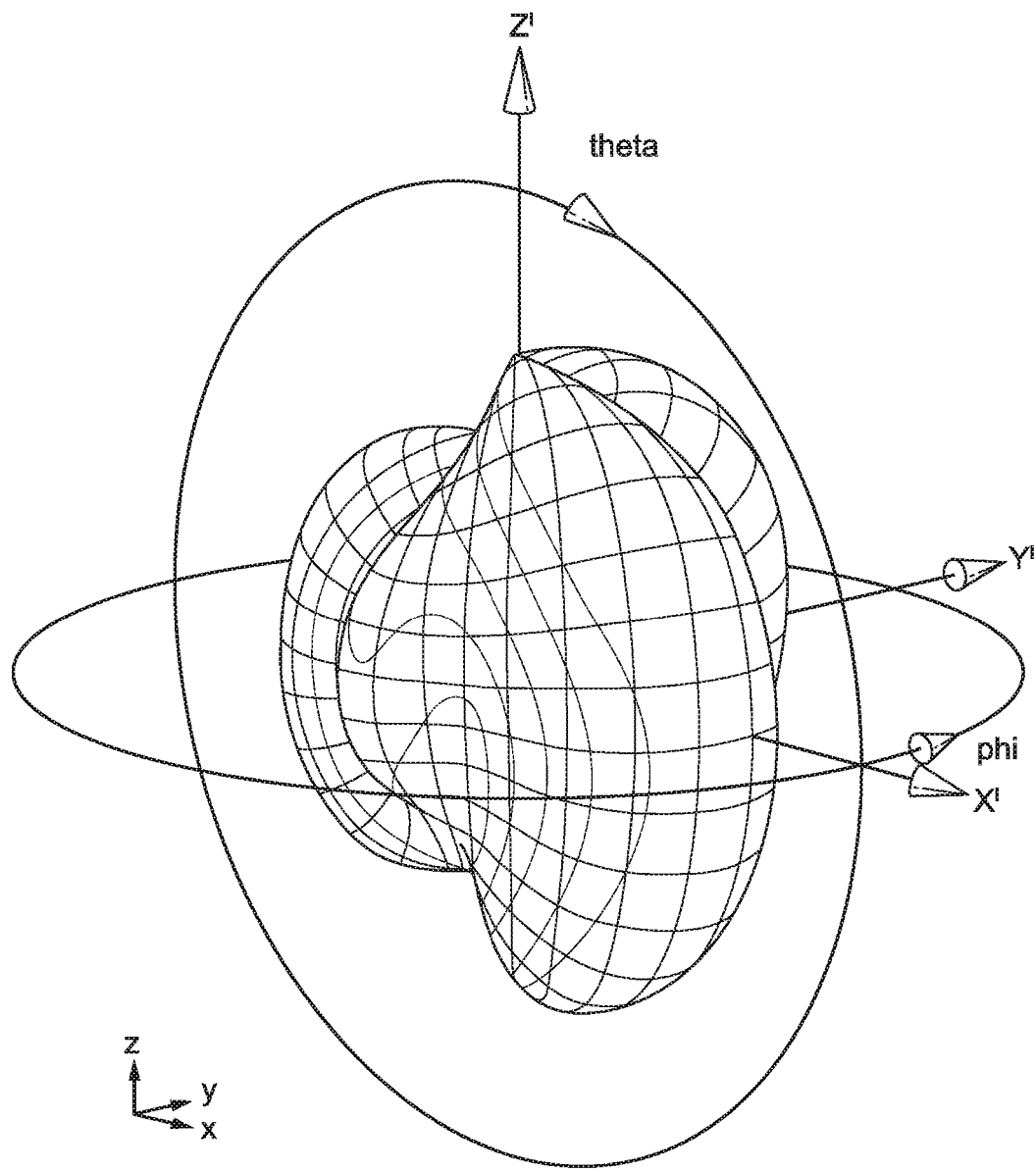
FIGS. 2a and 2b show respectively simulated phi and theta components of the electric field generated by the inverted-L antenna in free space.
Figure 2B:
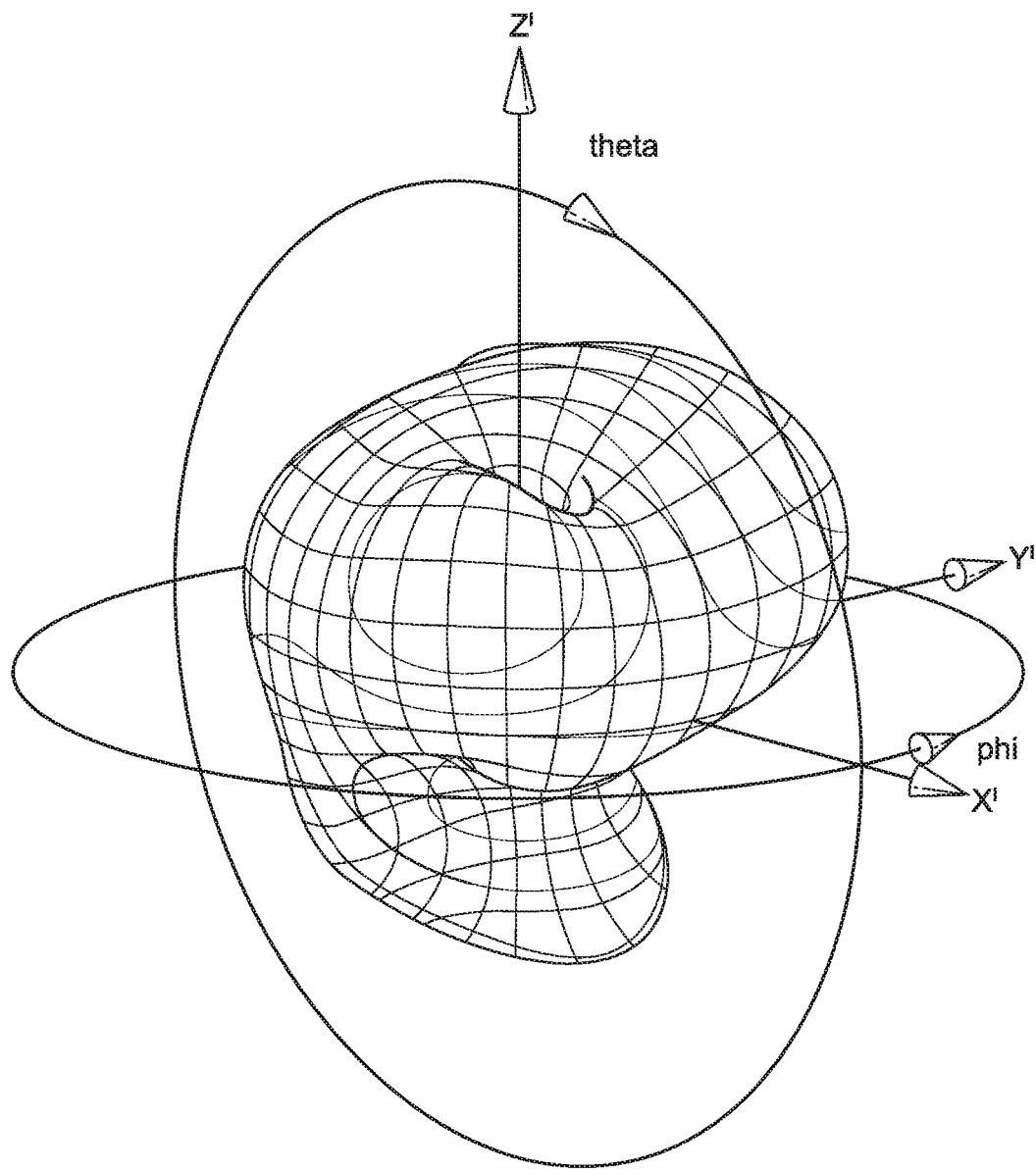

FIG. 1b shows the simulated radiation pattern of the inverted-L antenna 1. The simulated peak antenna gain is approximately 2.7 dBi. The antenna radiation pattern shown in FIG. 1b relates to the total electric field strength, which does not provide insight into the antenna polarisation. FIGS. 2a and 2b show the simulated phi and theta components respectively (spherical coordinates) of the electric field generated by the antenna 1 in free space. From the theta component (shown FIG. 2b), there is a sizable electric field component that would be generated perpendicular to the ground plane 2 and therefore suitable for exciting the TEM wave between two parallel plates, parallel to the ground plane 2.

Figure 3:
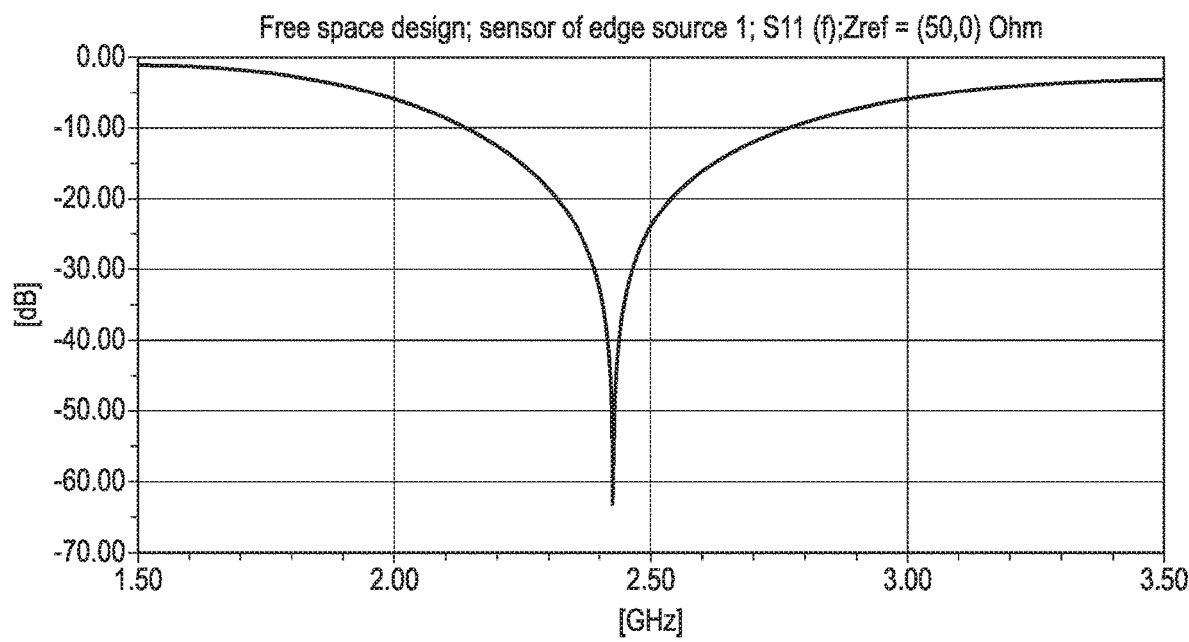
FIG. 3 shows the simulated return loss of the inverted-L antenna in free space.

FIG. 3 shows the simulated return loss for the improved inverted-L antenna. The design shows a very good impedance match to 50 ohms. The bandwidth at 10 dB return loss is approximately 600 MHz, which is large.

An alternative inverted-F antenna design was considered, incorporating a matching section to enable impedance matching to 50 Ohms. However, a good match was achieved with the simpler inverted-L antenna, by adjusting the feed-point position and dimensions of the ground plane 2. As one example, the PCB may have dimensions 80×60 mm (in the x and y directions) and the antenna wire may have dimensions approximately 20 mm vertical (in the z direction) and approximately 12 mm horizontal (in the x direction), with a feedpoint location approximately 12×10 mm (in the x and y directions) from the corner.

Effect of Parallel Plates

The simulated return loss of the inverted-L antenna 1 in free space was very good. However, this design must also present a good match when placed between two metal plates spaced close together.

Figure 4:
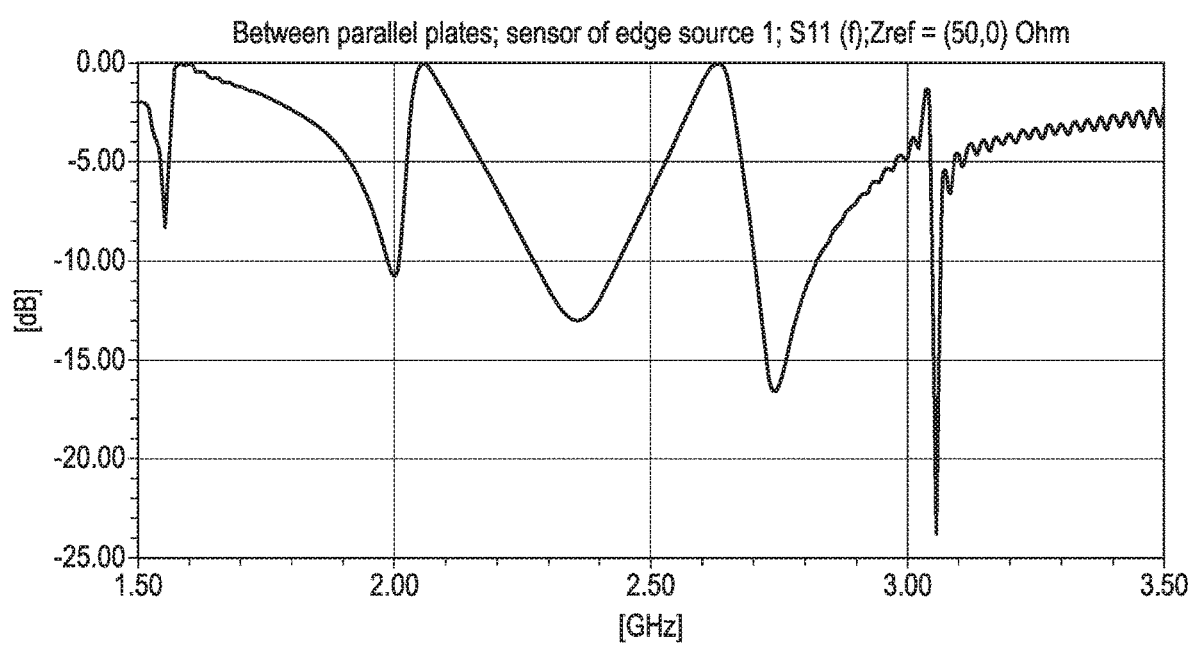
FIG. 4 shows the simulated return loss of the inverted-L antenna between parallel metal plates.

FIG. 4 shows the simulated return loss for the inverted-L antenna 1 positioned between parallel plates with a 40 mm separation. The return loss at 2.4 GHz is not as good as compared with that for the antenna design in free space but the match is still adequate. There is a slight downwards frequency shift, but much less than for the alternative inverted-F antenna.

The additional responses in the simulated return loss are the result of the antenna 1 being placed between the parallel plates. However, these additional responses do not affect the operation of the antenna 1 at the frequency of interest.

Experiment—Free Space Performance

The inverted-L antenna 1 connected to an RF source at 2.4 GHz was placed on a non-conductive table for support. A receive antenna with 9.5 dBi gain was connected to a spectrum analyser and positioned 0.5 m from the inverted-L antenna 1. The free-space path loss over 0.5 m at 2.4 GHz is 34.0 dB.

The inverted-L antenna 1 was rotated in azimuth and the peak power at the receive antenna was measured on the spectrum analyser. The receive antenna was 'peaked up' to measure the highest power level and, therefore, the maximum gain. The receive antenna was also rotated to measure the separate vertically and horizontally polarised components. The Friis transmission formula was used to determine the antenna gain. The measurements results are presented in Table 1 below. The peak measured gain of the inverted-L antenna was 2.5 dBi, which is consistent with the peak simulated gain of 2.7 dBi.

TABLE 1

Measured free-space gain of inverted-L antenna

| Azimuth (deg) | Polarisation | Received Power (dBm) | Path Loss (dB) | Receive Antenna Gain (dBi) | Transmit Power (dBm) | Inverted-L Antenna Gain (dBi) |
|---|---|---|---|---|---|---|
| 0 | Vertical | −26.0 | −34.0 | +9.5 | −4.0 | +2.5 |
| 0 | Horizontal | −36.5 | −34.0 | +9.5 | −4.0 | −8.0 |
| 90 | Vertical | −29.5 | −34.0 | +9.5 | −4.0 | −1.0 |
| 90 | Horizontal | −32.5 | −34.0 | +9.5 | −4.0 | −4.0 |
| 180 | Vertical | −27.5 | −34.0 | +9.5 | −4.0 | +1.0 |
| 180 | Horizontal | −26.5 | −34.0 | +9.5 | −4.0 | +2.0 |
| 270 | Vertical | −31.0 | −34.0 | +9.5 | −4.0 | −2.5 |
| 270 | Horizontal | −28.0 | −34.0 | +9.5 | −4.0 | +0.5 |

Experiment—Parallel Plate Performance

The measurements were then repeated but with the inverted-L antenna 1 placed between the two parallel plates. The results are given in Table 2 below. The peak antenna gain between the plates was measured to be +9.0 dBi, which is 6.5 dB higher than that in free space. The gain for horizontal polarisation is reduced because the TEM wave polarisation is vertical relative to the parallel plates.

TABLE 2

Measured gain of inverted-L antenna between two parallel plates

| Azimuth (deg) | Polarisation | Received Power (dBm) | Path Loss (dB) | Receive Antenna Gain (dBi) | Transmit Power (dBm) | Inverted-L Antenna Gain (dBi) |
|---|---|---|---|---|---|---|
| 0 | Vertical | −24.5 | −34.0 | +9.5 | −4.0 | +4.0 |
| 0 | Horizontal | −38.5 | −34.0 | +9.5 | −4.0 | −10.0 |
| 45 | Vertical | −31.5 | −34.0 | +9.5 | −4.0 | −3.0 |
| 45 | Horizontal | −32.5 | −34.0 | +9.5 | −4.0 | −4.0 |
| 90 | Vertical | −19.5 | −34.0 | +9.5 | −4.0 | +9.0 |
| 90 | Horizontal | −33.0 | −34.0 | +9.5 | −4.0 | −4.5 |
| 135 | Vertical | −22.0 | −34.0 | +9.5 | −4.0 | +6.5 |
| 135 | Horizontal | −30.0 | −34.0 | +9.5 | −4.0 | −1.5 |
| 180 | Vertical | −20.5 | −34.0 | +9.5 | −4.0 | +8.0 |
| 180 | Horizontal | −36.0 | −34.0 | +9.5 | −4.0 | −7.5 |
| 225 | Vertical | −20.5 | −34.0 | +9.5 | −4.0 | +8.0 |
| 225 | Horizontal | −31.0 | −34.0 | +9.5 | −4.0 | −2.5 |
| 270 | Vertical | −19.5 | −34.0 | +9.5 | −4.0 | +9.0 |
| 270 | Horizontal | −33.0 | −34.0 | +9.5 | −4.0 | −4.5 |
| 315 | Vertical | −21.0 | −34.0 | +9.5 | −4.0 | +7.5 |
| 315 | Horizontal | −25.5 | −34.0 | +9.5 | −4.0 | +3.0 |

Conclusions

The simulation and experiments described above indicates that efficient propagation could occur in the narrow gaps between adjacent/stacked containers in a below-deck environment. This led to the design of a practical antenna that is efficient, does not detune significantly when placed between two closely spaced parallel plates, and generates significant electric field component perpendicular to the parallel plates.

The design of an antenna placed between two parallel plates is important because the antenna must excite the TEM wave between the two closely spaced plates. The TEM wave can propagate efficiently with low loss between two parallel plates made of steel.

Overall, the findings above show that a shipping container can be monitored by an RF tag, not only for the above-deck case, but also for the situation of a container and tag positioned deep within the hold of a container ship, provided that a suitable antenna or base-station is located within a given hold compartment.

Tag Design

Figure 5:
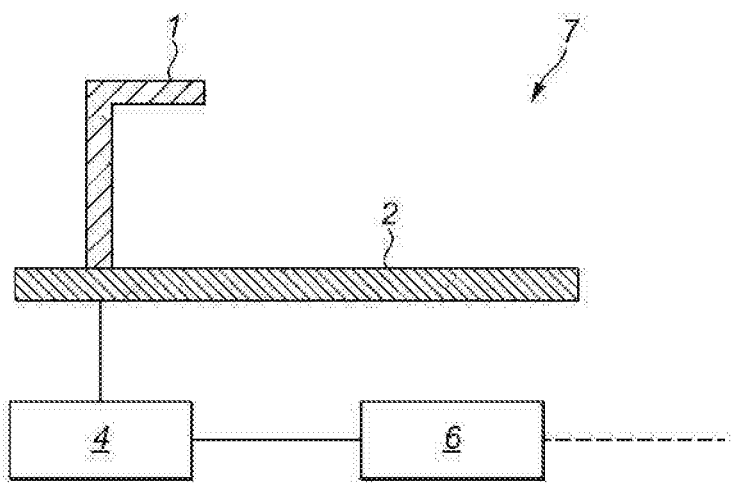
FIG. 5 is a schematic diagram of an RF tag incorporating an antenna in an embodiment of the invention.
Figure 6:
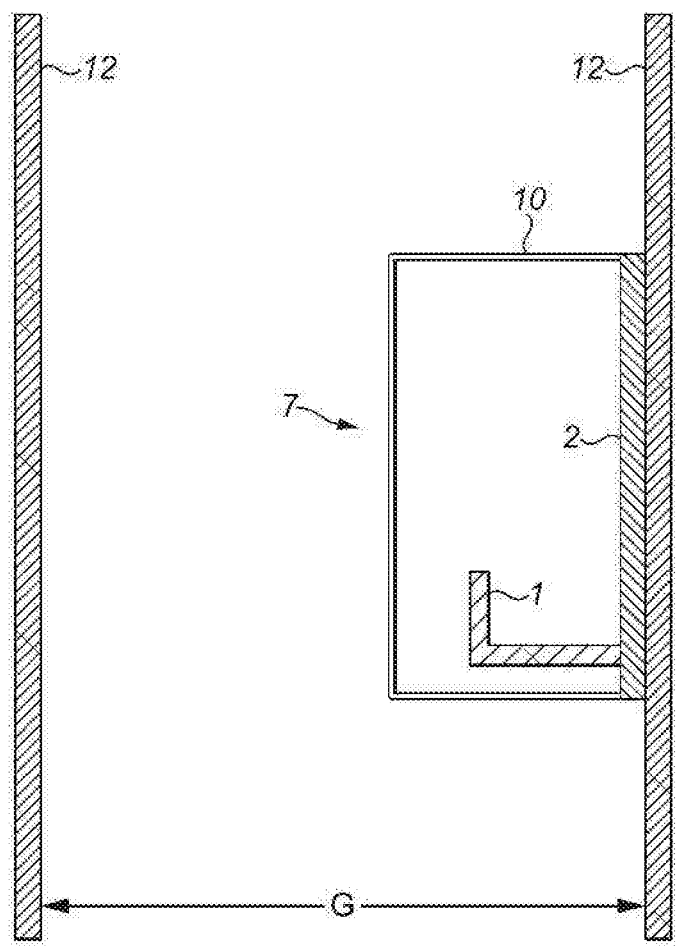
FIG. 6 is a schematic diagram of the mounting of the RF tag to the side of a container.

The antenna design described above may be incorporated in an RF tag 7 for mounting on a container, as shown for example in FIGS. 5 and 6. The RF tag 7 comprises a transceiver 4 connected to the antenna 1, and a processor 6. The transceiver 4 may comprise an integrated circuit (IC), preferably mounted on a PCB forming the ground plane 2. In cases where only unidirectional transmission is required, the transceiver 4 may instead be a transmitter. The processor 6 may comprise a low power microprocessor, preferably also mounted on the PCB. Optionally, one or more status inputs (shown as a dashed line) may be provided to the processor 6, for example to provided status information of the RF tag 7 and/or of a container to which the tag 7 is attached.

The processor 6 controls the transceiver 4 to periodically transmit data including the identity of the RF tag 7, event time and message data such as status data. These transmissions may be UNB (ultra narrow band) transmissions comprising at least a tag ID that substantially uniquely identifies the tag, and optionally message data (containing for example the status information mentioned above), event timing data and/or error correction data. The frequency spectra used for these transmissions may be those reserved for RFID communications e.g. 865-868 MHz or 2446-2454 MHz.

A power supply (not shown) is also provided, for providing power to the transceiver 4 and the processor 6. The power supply is preferably a battery; this may be rechargeable in order to extend the useable life of the tag, but currently available rechargeable batteries significantly self-discharge within a year. For applications such as container tracking where low maintenance is important, a non-rechargeable battery with a long shelf life, such as a lithium metal primary battery, may be used.

The RF tag 7 may include a housing 10, as shown FIG. 6. Preferably, the RF tag 7 is self-contained and includes all the required components such as the battery within the housing 10. To enable use in the 'parallel plate' mode described above, the RF tag 7 may be fixed to a side wall 12 of a container, so that the antenna 1 will be located in a gap G between parallel walls 12 of adjacent containers, and the ground plane 2 is substantially parallel to the side walls 12. Where the side walls 12 are corrugated, the RF tag 7 may be fixed within a corrugation, to avoid damage.

System Architecture

Figure 7:
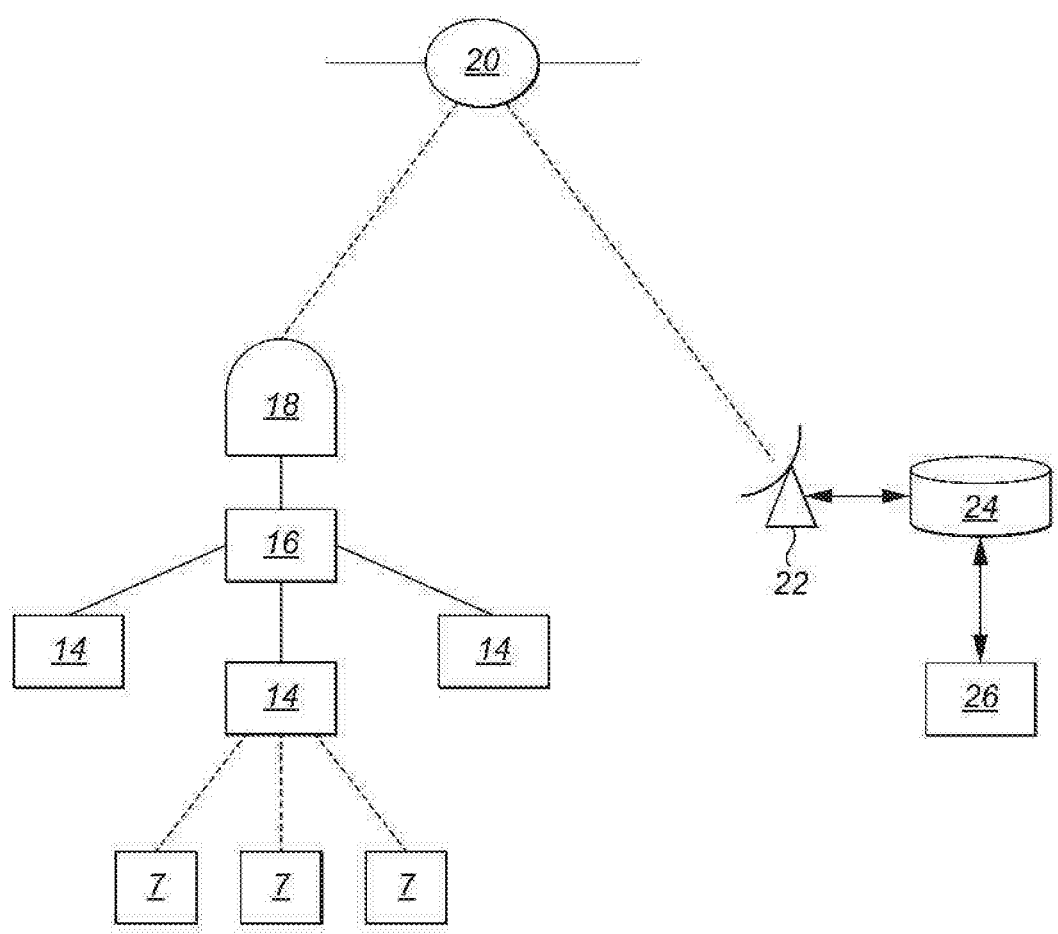
FIG. 7 is a diagram of a system architecture for use with a plurality of the RF tags.

FIG. 7 shows an example of a system architecture for container tracking, in which the RF tags 7 may be used. The RF tags 7 transmit data periodically, as described above, to one or more base stations 14, which may be installed within the hold or on the deck of a ship, at a dockside or at a container storage facility, for example.

The base stations 14 communicate with a central communication system 16 in the locality of the base stations 14; this is typically done over a wired connection. The central communication system 16 communicates via a satellite terminal 18 and a satellite 20 to a satellite earth station 22, which is in communication with a tracking database 24. In this way, the tracking database 24 stores data transmitted by the RF tags, and optionally additional location and/or status data added by other parts of the system, such as the base stations 14 or the central communication system. The tracking database 24 may be queried by a container tracking application 26.

ALTERNATIVE EMBODIMENTS

Many alternative embodiments may be envisaged, which nevertheless fall within the scope of the invention as defined by the claims. It is understood that protection is sought hereby for any and all novel subject matter and combinations thereof disclosed herein. Unless the contrary is stated, features of each embodiment may be combined with features of any other.

The invention claimed is:

1. A container tracking system comprising a plurality of containers having metallic walls, at least one of the containers having a radio frequency (RF) tag mounted on a metallic wall thereof for tracking the container, the RF tag having an antenna arranged to excite a transverse electromagnetic (TEM) wave relative to a ground plane of the antenna, which is substantially parallel to said metallic wall; the containers being arranged such that the metallic walls of adjacent ones of the containers form a waveguide in which the antenna is arranged to excite the TEM wave with an electric field component thereof perpendicular to the metallic walls.

2. The container tracking system of claim 1, wherein the antenna comprises a monopole antenna.

3. The container tracking system of claim 1, wherein the antenna comprises an inverted-L antenna.

4. The container tracking system of claim 1, wherein the antenna comprises an inverted-F antenna.

5. The container tracking system of claim 1, wherein the ground plane comprises a printed circuit board (PCB).

6. The container tracking system of claim 1, wherein the RF tag includes an RF transmitter connected to the antenna and a processor arranged to control the RF transmitter to transmit data pertaining to the RF tag.

7. The container tracking system of claim 1, wherein the containers comprise intermodal freight containers.

8. The container tracking system of claim 1, comprising at least one base station for RF communication with the RF tag, and a tracking database for receiving tracking information from the RF tag via the at least one base station.

9. The container tracking system of claim 1, wherein the at least one base station communicates with the tracking database via satellite.

10. A method of tracking a container having a metallic wall, comprising:
   a. mounting a radio frequency (RF) tag on the metallic wall, the RF tag having an antenna arranged to excite a transverse electromagnetic (TEM) wave relative to a ground plane of the antenna, the ground plane being substantially parallel to said metallic wall;
   b. arranging said container within a plurality of containers having metallic walls that are substantially parallel and having a gap therebetween, such that the metallic walls form a waveguide; and
   c. exciting a transverse electromagnetic (TEM) wave in the gap, with an electric field component thereof perpendicular to the metallic walls, using the RF tag of said container.

11. The method of claim 10, wherein the antenna comprises a monopole antenna.

12. The method of claim 10, wherein the antenna comprises an inverted-L antenna.

13. The method of claim 10, wherein the antenna comprises an inverted-F antenna.

14. The method of claim 10, wherein the ground plane comprises a printed circuit board (PCB).

15. The method of claim 10, wherein the RF tag includes an RF transmitter connected to the antenna and a processor arranged to control the RF transmitter to transmit data pertaining to the RF tag.

16. The method of claim 10, wherein the containers comprise intermodal freight containers.

17. The method of claim 10, further comprising transmitting tracking information from the RF tag to at least one base station, and receiving the tracking information in a tracking database via the at least one base station.

18. The method of claim 17, wherein the tracking information is received via satellite.

\* \* \* \* \*